United States Patent Office 2,784,096
Patented Mar. 5, 1957

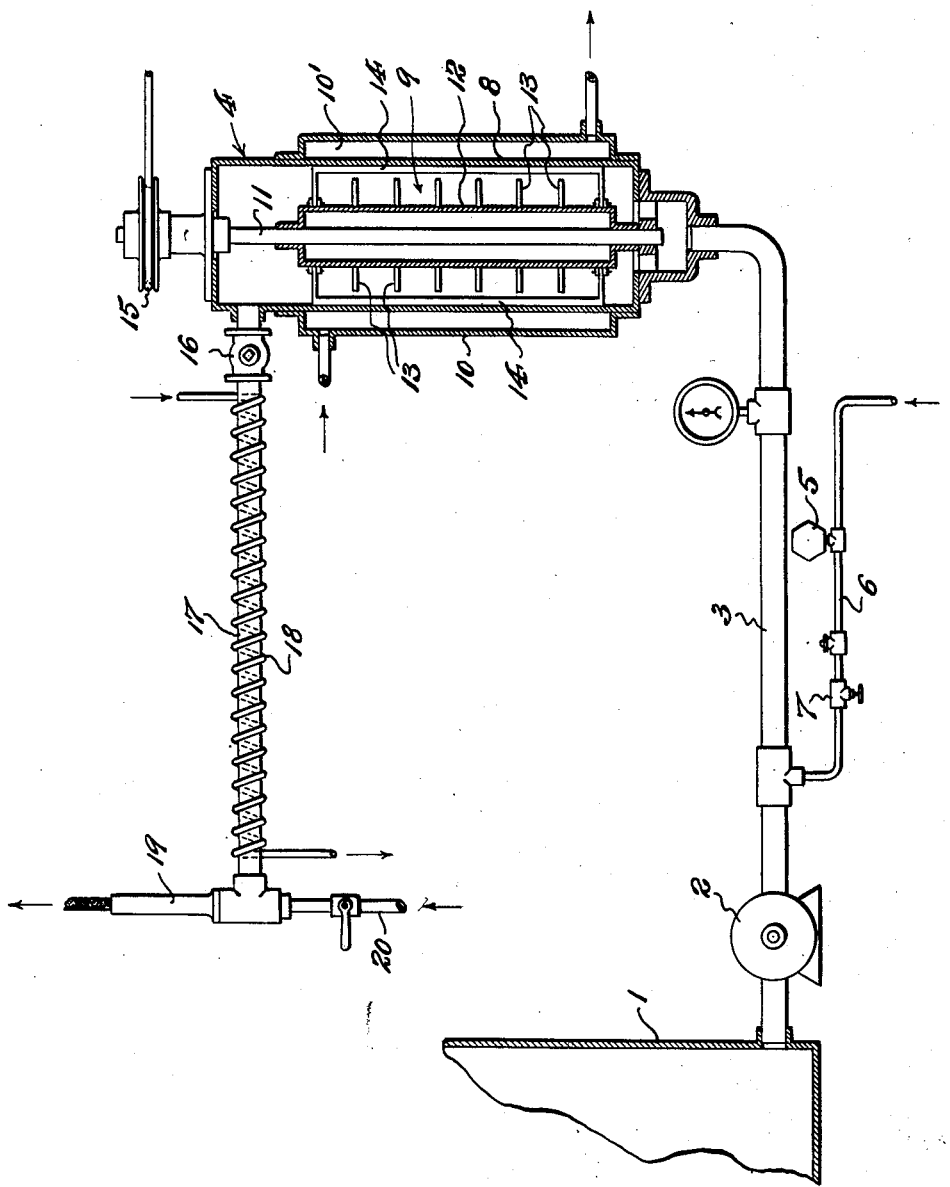

2,784,096

METHOD OF CONTINUOUSLY PRODUCING AERATED CHOCOLATE AND OTHER CONFECTIONS

Vincent R. Ciccone, Montclair, N. J., assignor to Charms Company, Bloomfield, N. J., a corporation of New Jersey Application December 14, 1953, Serial No. 398,049

5 Claims. (Cl. 99—23)

This invention relates to a continuous process for aerating chocolate, chocolate-like compounds, and other fondant compounds in the manufacture of confections.

This invention has for an object to provide a method of continuously producing aerated chocolate and other confections, and extruding the same in bar or other shapes comprising a homogeneous mass of smooth texture, in which the incorporated air or other gas is uniformly distributed and mechanically suspended throughout the mass in the form of finely divided, approximately microscopic, air or gas cells.

Since pure chocolate consists of cocoa matter, cocoa fat or butter, and sugars, and, in milk chocolate, the addition of milk solids, and since technically a cocoa compound which contains fat other than cocoa fat is not, by standard, considered to be chocolate, it is another object of this invention to provide an aerating method which is applicable not only to pure chocolate, but also to mixtures of chocolate and some hydrogenated vegetable fat, and also to mixtures, similar to chocolate, comprising hydrogenated edible fats, sugars, milk powder, cocoa powder, with or without the addition of emulsifying agents, colors and flavors.

Heretofore, methods of aerating chocolate and chocolate type mixtures or compounds usually comprise a non-continuous or batch treatment of the material, and consist in melting the chocolate or chocolate type mixtures or compounds, and then mechanically whipping air or other gas into the hot melted material either under atmospheric or superatmospheric pressures, and then, after such aeration, chilling the product under reduced pressure to set or solidify the same so as to entrap the incorporated air or other gas in the mass thereof; or, by another method, moisture is added to the melted material, prior to or during whipping, whereby to render the material more viscous while the air is incorporated, and then, after the whipping process is completed, allowing the material to set or solidify, whereafter the mass is subject to a drying step in order to remove and dispel the added moisture. Such methods are not satisfactory, since the same require complicated equipment, are not continuous, and are difficult to control, and consequently do not incorporate the air or gas in uniform distribution throughout the material mass, or in sufficiently finely divided state in the form of approximately microscopic air or gas cells, so that the texture of the resultant product is uneven or coarse. Having this in view, it is a further object of this invention, not only to overcome the objections to the aforesaid prior methods, but to provide a method which can be performed in a continuous manner, and which assures uniform distribution of finely divided air or gas cells of comparatively minute size, in mechanical suspension throughout the mass of the resultant confectionary product.

The above stated and other objects will be understood from a reading of the following description of this invention in connection with the accompanying drawing which provides a schematic showing of apparatus by aid of which the novel method of aerating chocolate, chocolate type and other confectionary mixtures or compounds can be practiced according to this invention.

In performing the method of this invention, the chocolate, mixture of chocolate and hydrogenated vegetable fats, or other chocolate type compounds containing either vegetable or edible fats, as the case may be, is first heated to a temperature at which the material becomes flowable and all of its contained fats are reduced to a fluid state; which temperature for most chocolate and chocolate like material should approximate 112° F. The material thus initially conditioned is then caused to continuously flow through a combined heat exchanger and agitating apparatus, and on the way thereto, air, nitrogen, carbon dioxide or other nonsoluble gas, under suitable pressure, is introduced into the stream thereof. As the material with accompanying air or other gas traverses the combined heat exchanger and agitating apparatus, it is rapidly cooled to a temperature substantially below that at which its contained fats would otherwise become solid, i. e., to a superchilled condition; which temperature for most chocolate and chocolate like material should approximate 69°. While thus superchilled, the continuously advancing material is simultaneously subjected to constant agitation as it traverses said apparatus, and consequently the contained fats are substantially prevented from solidifying, since the forward motion and accompanying agitation of the material retards and substantially prevents tendency of the fats to change from a liquid to a solid condition, and therefore the progressing material becomes substantially viscous, while, at the same time, the content of air or other non-soluble gas with which it has been charged is, by the agitation of the material, whipped into the mass of the same so as to be uniformly distributed throughout and mechanically suspended within the mass thereof in the form of a multiplicity of separated minute or substantially microscopic cells, thus producing a resultant homogeneous aerated mass of smooth texture characteristics. The amount of air or other gas thus incorporated in the material may optionally be varied according to the density desired with respect to the final or finished product; the percentage or proportion of air may be selectively varied between 1 or 2% to 50% to 60% by volume of finished product.

As the superchilled and aerated material is discharged from the combined heat exchanger and agitating apparatus, so that agitation thereof is arrested, the contained fats tend to crystallize or become solid. The speed at which the material tends to set or solidify depends in part on the character of the contained fat. If e. g. the contained fat is solely cocoa butter, the material tends to set very quickly immediately agitation thereof ceases, since cocoa butter possesses a very sharp setting point. When, however, the material also contains a percentage of cocoanut butter or similar vegetable fat, such material tends to set more slowly, for the reason that cocoanut butter and similar vegetable fats are composed of fractions of fat which have varying setting points not as sharp as that of cocoa butter. The speed at which the material tends to set or solidify also depends on the operating conditions within the combined heat exchanger and agitating apparatus, since when the material is subjected to treatment within the latter some of its contained fat tends to crystallize. However, by regulating the speed of flow of the material through said apparatus, and thus the time of processing, and by predetermining the speed and scraping effect of the agitating mechanism, the amount of fat which crystallizes during the treatment can be controlled, and consequently the final setting point of the discharged material outgoing from the heat exchanger and agitating apparatus can be likewise controlled. In other words, the texture of the discharged material and the time within which it will set can be controlled, according to the character of contained fats involved, by the operating conditions of the combined heat exchanger and agitating apparatus.

As the material discharges from the combined heat exchanger and agitating apparatus, it is caused to flow through a holding section or conduit under temperature conditions calculated to permit substantial crystallization or solidification of its contained fats, whereby to suitably condition the same for extrusion through a shaping nozzle into desired bar or other shape. By suitably predetermining the length of said holding section or conduit, a selected condition of the material, as to its degree of hardness or softness, can be attained suitable for extrusion thereof to its desired finished product form. In other words, the material is held in the holding section or conduit long enough to assure that enough of its contained fat has sufficiently crystallized or solidified to provide an extrudible material of desired consistency, either solid or semi-solid.

The holding section or conduit is preferably provided with means to maintain a temperature of its walls at such degree as will keep the contacting surfaces of the material moving therethrough sufficiently liquid to readily slip thereon, or, in other words, to provide the material advancing therethrough with a self-lubricating holding section or conduit wall contacting surface.

If desired, the material, as produced by the method of this invention, may include various solids desired to be incorporated therein, such as nuts, raisins or other fruits, hard candy and similar additions.

In extruding the finished product to a desired bar or other shape, it may be desired to provide means, cooperative with the extruding nozzle, which is operative to incorporate into the extruded shape, as a center filling, other confectionary material, such as peanut butter, marshmallow, caramel, or other filling confection.

As a specific example of the performance of the method of this invention, as carried out with the aid of apparatus shown in the accompanying drawings, a mixture of sweet chocolate and hydrogenated cocoanut butter is deposited in a supply tank 1, and subjected to heat approximately 112° F. in order to reduce its contained fats to a liquid condition, and to render the mixture flowable. The flowable mixture is suitably delivered from the supply tank 1 to a feed pump 2, by which it is passed through a feed line or conduit 3 to a combined heat exchanger and agitating apparatus 4. As the mixture passes through said feed line or conduit 3, compressed air or other suitable non-soluble gas is delivered through metering means 5, by way of a supply line or conduit 6 and control valve 7, into the feed line or conduit 3; so as to accompany the mixture into the heat exchanger and agitating apparatus 4.

Said heat exchanger and agitating apparatus 4 comprises a suitably sized cylinder 8, the interior 9 of which provides a treatment chamber. Surrounding the cylinder 8 is an external jacket 10, through the interior 10' of which a suitable refrigerant is circulated, such as brine, ammonia, Freon, cold water, or any cooling medium operative to extract heat from the mixture in and passing through said treatment chamber 9, whereby to chill the mixture to a temperature below that at which its contained fats would normally solidify; which temperature, for the instant mixture, should be substantially about 69° F. Extending axially within the treatment chamber 9 is the drive shaft 11 of a rotatable agitator member 12, which carries radial whipping members 13, also extending from the agitator member 12 are blade sections 14 adapted to contact and scrape the internal wall surfaces of the treatment chamber cylinder 8. Said agitator member 12 is rotated at a comparatively high speed, e. g. approximating 400 R. P. M., by any suitable power transmission means, such as a belt driven pulley 15 which is mounted on the external end of the drive shaft 11.

The chilled mixture, with the accompanying air or other non-soluble gas, which fills the treatment chamber 9 of the heat exchanger and agitating apparatus, is violently agitated or whipped by the whipping members 13 of the rapidly rotated agitator member 12, whereby the air or other non-soluble gas is reduced to a multiplicity of separate minute cells which, by the whipping action, are intermingled with and uniformly distributed throughout the mass of the mixture so as to be mechanically suspended therein. Such intermingling and uniform distribution of the minute air or other gas cells, is made possible of attainment due to the fact that the chilled condition of the mixture, under the agitation to which it is subjected, prevents the contained fats from solidifying, so that the mixture is kept in such viscous condition that the air or other gas can easily be caused to permeate the mass thereof. If some crystallization of the contained fats occurs, with tendency to deposit on the cylinder wall surface, the scraping action of the blade sections 14 of the agitator member 12 prevents such accumulation of fatty particles, and by scraping the latter away from said wall surfaces, causes the same to be distributed throughout the mixture mass without substantially reducing the viscous and flowable condition of said mass.

The movement of the mixture through the treatment chamber 9 is sufficiently retarded by a back pressure valve 16, with which the discharge end of the treatment chamber communicates, as to assure time to attain the desired aeration of the mixture mass before it leaves said treatment chamber.

Upon leaving the treatment chamber 9 of the heat exchanger and agitating apparatus 4, the now aerated material is delivered to a holding section or conduit 17, through which it is caused to flow onward to means by which it is to be extruded to desired bar or other shape.

Since in its movement through the holding section or conduit 17, the material is no longer subject to agitation, its contained fats will crystallize or solidify, thus entrapping and holding the incorporated air or other gas cells distributed throughout and suspended within its mass, while nevertheless permitting the aerated material to flow on to the extrusion means. As above stated, the speed at which solidifying of the fats occurs, and the aerated material sets to extrudable condition, can be controlled by the length of the holding section or conduit, or by the time required to traverse the same, by varying these factors, the texture (i. e. hardness or softness) of the material at the extruding point can be controlled. The temperature conditions of the holding section or conduit should be such that its walls are maintained at a temperature which assures easy slip of the advancing material therethrough. Room temperature may be sufficient to assure this, but, if not, means can be provided to warm the walls of the holding section or conduit as required. Means for this purpose may comprise a heating coil 18 wound around the holding section or conduit 17, through which a heating medium can be circulated, e. g. warm water not substantially exceeding 90° F.

The holding section or conduit 17 leads to an extrusion nozzle 19, through which the aerated material can be discharged in a desired bar or other shape. After such extruded discharge and shaping of the now substantially solidified aerated material, the same can be cut into desired lengths, and then coated with enrobing non-aerated chocolate or other coating material to complete the product.

If it is desired to incorporate in the extruded aerated material centers of other confections, the selected center substance can be delivered by a delivery conduit 20 to flow axially through the extrusion nozzle 19, so as to be surrounded by the aerated material issuing from said nozzle.

Having now described my invention, I claim:

1. A method of continuously producing aerated chocolate and chocolate confectionary material containing fat comprising heating the material to a temperature at which the same becomes flowable and all its contained fat is reduced to a fluid state, then continuously delivering the fluid material to and passing it through a combined heat exchanger and agitating apparatus, introducing a predetermined amount of non-soluble gas into the fluid material prior to entrance thereof into said apparatus, chilling the material while agitating the same within said apparatus as it continuously progresses therethrough to a temperature below that at which its contained fat would otherwise solidify, whereby to retain the fat in substantially fluid condition and the material at viscous consistency so that agitation of the material will whip the accompanying non-soluble gas into minute cells uniformly distributed throughout and mechanically suspended within the material mass, then during progressive discharge of the aerated material from said apparatus under non-agitating conditions, allowing its contained fat to solidify and the material to set to an extrudable consistency as it is continuously moved toward an extruding means, and finally ejecting the set material through said extruding means whereby to form the same to suitable body shape.

2. A method of continuously producing aerated chocolate and chocolate confectionary material containing fat comprising heating the material to a temperature at which the same becomes flowable and all its contained fat is reduced to a fluid state, then continuously delivering the fluid material to and passing it through a combined heat exchanger and agitating apparatus, introducing a predetermined amount of non-soluble gas into the fluid material prior to entrance thereof into said apparatus, chilling the material while agitating the same within said apparatus as it continuously progresses therethrough to a temperature below that at which its contained fat would otherwise solidify, whereby to retain the fat in substantially fluid condition and the material at viscous consistency so that agitation of the material will whip the accompanying non-soluble gas into minute cells uniformly distributed throughout and mechanically suspended within the material mass, continuously discharging the aerated material from the heat exchanger and agitating apparatus in a non-agitated moving stream of sufficient length to allow time for the contained fat to solidify and the aerated material to set to an extrudable consistency, and thereafter ejecting the set aerated material through extruding means adapted to form it to an ultimate suitable body shape.

3. A method of continuously producing aerated chocolate and chocolate confectionary material containing fat comprising heating the material to approximately 112° F. in order to reduce its contained fat to a liquid condition and to render the material fluid, pumping the fluid material through a feed conduit to a refrigerated agitator apparatus through which the material is caused to continuously pass, introducing into the feed conduit a predetermined amount of compressed non-soluble gas to accompany said material into said agitator apparatus, chilling the material while agitating the same within said apparatus as it continuously progresses therethrough to temperature of about 69° F., whereby to allow the fat, without substantial solidification, to be distributed throughout the material mass in viscous condition, agitation of the thus conditioned material mass being operative to whip the accompanying non-soluble gas into minute cells uniformly distributed throughout and mechanically suspended within said material mass whereby to aerate the latter, then, during progressive discharge of the aerated material from the agitator apparatus under non-agitating conditions, allowing its contained fat to solidify and the material to set to an extrudable consistency for final ejection through extruding means adapted to form the same to suitable body shape.

4. A method of continuously producing aerated chocolate and chocolate confectionary material containing fat comprising heating the material to approximately 112° F. in order to reduce its contained fat to a liquid condition and to render the material fluid, pumping the fluid material through a feed conduit to a refrigerated agitator apparatus through which the material is caused to continuously pass, introducing into the feed conduit a predetermined amount of compressed non-soluble gas to accompany said material into said agitator apparatus, chilling the material while agitating the same within said apparatus as it continuously progresses therethrough to temperature of about 69° F., whereby to allow the fat, without substantial solidification, to be distributed throughout the material mass in viscous condition, agitation of the thus conditioned material mass being operative to whip the accompanying non-soluble gas into minute cells uniformly distributed throughout and mechanically suspended within said material mass whereby to aerate the latter, continuously discharging the aerated material from the agitator apparatus for movement under non-agitating conditions through a holding conduit so that during its progress therethrough its contained fat will solidify and the aerated material will set to an extrudable consistency, and thereafter ejecting the set aerated material through extruding means adapted to form it to suitable body shape.

5. A method of continuously producing aerated chocolate and chocolate confectionary material containing fat comprising heating the material to approximately 112° F. in order to reduce its contained fat to a liquid condition and to render the material fluid, pumping the fluid material through a feed conduit to a refrigerated agitator apparatus through which the material is caused to continuously pass, introducing into the feed conduit a predetermined amount of compressed non-soluble gas to accompany said material into said agitator apparatus, chilling the material while agitating the same within said apparatus as it continuously progresses therethrough to temperature of about 69° F., whereby to allow the fat, without substantial solidification, to be distributed throughout the material mass in viscous condition, agitation of the thus conditioned material mass being operative to whip the accompanying non-soluble gas into minute cells uniformly distributed throughout and mechanically suspended within said material mass whereby to aerate the latter, continuously discharging the aerated material from the agitator apparatus for non-agitated movement through a holding conduit so that during its progress therethrough its contained fat will solidify and the aerated material will set to an extrudable consistency, maintaining the holding conduit walls at a temperature warm enough to assure slip of the aerated material therealong without substantially altering its set consistency, and finally ejecting the set aerated material through extruding means adapted to form it to suitable body shape.

References Cited in the file of this patent
UNITED STATES PATENTS

| | | |
|---|---|---|
| 2,384,077 | Crosley et al. | Sept. 4, 1945 |
| 2,645,580 | Schultz | July 14, 1953 |